(12) United States Patent
Hjelmström et al.

(10) Patent No.: US 10,075,642 B2
(45) Date of Patent: Sep. 11, 2018

(54) METHOD AND SYSTEM FOR IMAGE STABILIZATION

(71) Applicant: AXIS AB, Lund (SE)

(72) Inventors: Jonas Hjelmström, Staffanstorp (SE); Andreas Nilsson, Häljarp (SE)

(73) Assignee: AXIS AB, Lund (SE)

( * ) Notice: Subject to any disclaimer, the term of this patent is extended or adjusted under 35 U.S.C. 154(b) by 14 days.

(21) Appl. No.: 15/049,952

(22) Filed: Feb. 22, 2016

(65) Prior Publication Data

US 2016/0295115 A1    Oct. 6, 2016

(30) Foreign Application Priority Data

Apr. 2, 2015   (EP) .................................... 15162433

(51) Int. Cl.
 *H04N 5/232*   (2006.01)

(52) U.S. Cl.
 CPC ..... *H04N 5/23287* (2013.01); *H04N 5/23212* (2013.01); *H04N 5/23254* (2013.01); *H04N 5/23258* (2013.01); *H04N 5/23267* (2013.01)

(58) Field of Classification Search
 CPC ........... H04N 5/23287; H04N 5/23254; H04N 5/23212; H04N 5/23258; H04N 5/23267
 USPC ................. 348/208.99, 208.2–208.5, 208.12
 See application file for complete search history.

(56) References Cited

U.S. PATENT DOCUMENTS

| | | | |
|---|---|---|---|
| 2006/0170388 A1 | 8/2006 | Nomura et al. | |
| 2011/0157381 A1 | 6/2011 | Miyasako | |
| 2013/0235252 A1* | 9/2013 | Tseng | H04N 5/23212 348/349 |
| 2014/0212002 A1* | 7/2014 | Curcio | G06K 9/00744 382/107 |
| 2014/0327812 A1* | 11/2014 | Shuda | H04N 5/23212 348/353 |
| 2014/0362275 A1* | 12/2014 | Brunner | H04N 5/23212 348/349 |

FOREIGN PATENT DOCUMENTS

EP         2285096 A1    2/2011

* cited by examiner

*Primary Examiner* — Yogesh Aggarwal
(74) *Attorney, Agent, or Firm* — Volpe and Koenig, P.C.

(57) ABSTRACT

In a method for image stabilization a number of operations are performed to stabilize an image and to output a focal length value. The steps include capturing video by means of a video camera with unknown focal length running an image stabilization process operating on an input from a hardware detector detecting the displacement of the camera and on an adjustable focal length value. Inter-image displacement is corrected based on the input from the hardware detector and the adjustable focal length value. By evaluating the displacement and adjusting the focal length value until a satisfactory image stabilization is achieved a value of the focal length may be output.

12 Claims, 4 Drawing Sheets

METHOD AND SYSTEM FOR IMAGE STABILIZATION

CROSS REFERENCE TO RELATED APPLICATION

This application claims the benefit of European Patent Application No 15162433.5 filed on Apr. 2, 2015, which is incorporated by reference as if fully set forth.

FIELD OF INVENTION

The present disclosure relates to a method and a system for image stabilization, in particular in relation to a video image stream captured by means of a video camera, suggestively a digital video camera.

BACKGROUND

The present disclosure will relate to the field of image stabilization, i.e. improvement of quality of a video image stream otherwise deteriorated by camera motion. There are numerous versions of digital-image stabilization, i.e. software applications that process stored image streams such that shakes or vibrations are minimized in a processed image stream. In the case of cameras, shakes or vibrations may be operator-induced or a result of a suspension not being able to suspend the camera in a vibration-free way. Solutions solely relying on a software-algorithm are often based on tracking of a finite number of features from image to image in the stream, and ensuring that these features are maintained static in a displayed image. These software solutions may be highly efficient in reducing the effect of shakes and vibrations, yet they may have a drawback in monitoring applications or surveillance applications where they may introduce an unwanted temporal lag, apart from consuming a significant computing power.

An alternative to this may be to use optical image stabilization, e.g. by shifting a set of lenses so as to shift an image parallel to the image plane and thereby counteracting the effect of the vibration or the shake. The shift of the set of lenses is performed as a response to a vibration quantified by miniature sensors, and it generally will require input of the focal-length settings. This technique may minimize the effect of a vibration or shake at the cost of a complex system. Also, the technique enables cancellation of blurring, otherwise being an effect of lens movement during exposure time.

Still another alternative may be to use a sensor-shift technology where the actual image sensor is shifted so as to follow the shift of the image induced by the motion of the camera.

The suggested methods all have their advantages and disadvantages. The present disclosure will mainly address issues appearing in relation to angular movement in a pan direction and/or a tilt direction. There are several aspects of this, yet for a monitoring camera or surveillance camera mounted in a fixed location and having pan/tilt functionality, a vibration in a pan/tilt dimensions may be a common effect during particularly windy conditions, as a result of heavy traffic, etc. The invention as disclosed herein may be applied to any video camera.

Some lenses uses feedback from zoom motors in order to keep track of the present focal length. However, there are also zoom lenses that do not have this feature, e.g. lenses where the zoom settings are made manually and other zoom lenses where there is no feedback function associated with the zoom motors. The category "zoom lenses" is typically divided into varifocal lenses and parfocal lenses and for the purposes of the present disclosure the word "zoom lens" will mainly be used and zoom setting and focus setting or focal length setting will be used in parallel.

SUMMARY

In an effort of providing a method for image stabilization and for deduction of a focal-length setting the present invention provides a novel method. The method comprises capturing video by means of a video camera, running an image stabilization process operating on an input from a hardware detector detecting the displacement of the camera and on an adjustable focal length value, correcting displacement based on the input from the hardware detector and the adjustable focal length value, evaluating displacement in the captured video of stationary objects of the scene at the present operation of the image stabilization process at the presently set focal length value, and adjusting the adjustable focal length value until the displacement identified in the captured image is below a threshold value. Optionally, the method may be set to find a minimum displacement.

The method will provide a straightforward deduction of the focal-length settings for a camera for which the current settings are unknown. As such it will also provide swift and accurate image stabilization.

In one or more embodiments the adjustable focal length value is adjusted based on a user input. The threshold value may be preset or set by an operator, and a combination thereof may also be used.

In one or several embodiment the adjustable focal length value may be adjusted according to an iterative optimization process until the displacement is below the predetermined threshold value.

In such an iterative optimization process use may be made of consecutive images in an image stream until the threshold value is reached, and in another embodiment a smaller set of images may be used in the iterative process.

The hardware detector may preferably detect shift in a pan direction and a tilt direction of the video camera, and the hardware detector may detect angular shift.

In one or more embodiments the hardware detector is an inclinometer, such as a gyroscopic device or a tilt meter.

In one or several embodiments the hardware detector detects a displacement of the video camera continuously, and wherein a time stamp of the displacement may be correlated with data of an individual frame.

In any embodiment of the present invention an output from the method may be a quantitative value of the focal length, for use in other processes performed in the camera or downstream thereof, or merely for presentation to an operator.

According to a second aspect use is made of the method according to any embodiment thereof. The use consists in inducing a shake or vibration to the video camera, after which the method may output a value of the focal-length setting. As such the use may also be said to comprise a method for calibrating a video camera.

According to yet another aspect there is provided a system for image stabilization of output images from a video camera. The system has a number of input parameters, comprising: an output of a hardware detector detecting a shift of the video camera, an adjustable focal length value, a processing unit for performing correction of an image based on the output from the hardware detector and the adjustable focal length value. The system may preferably be equipped to perform the method according to one or more embodiments mentioned herein, so as to deduce a value of the focal-length setting internally.

DETAILED DESCRIPTION OF THE PREFERRED EMBODIMENTS

Figure 1:
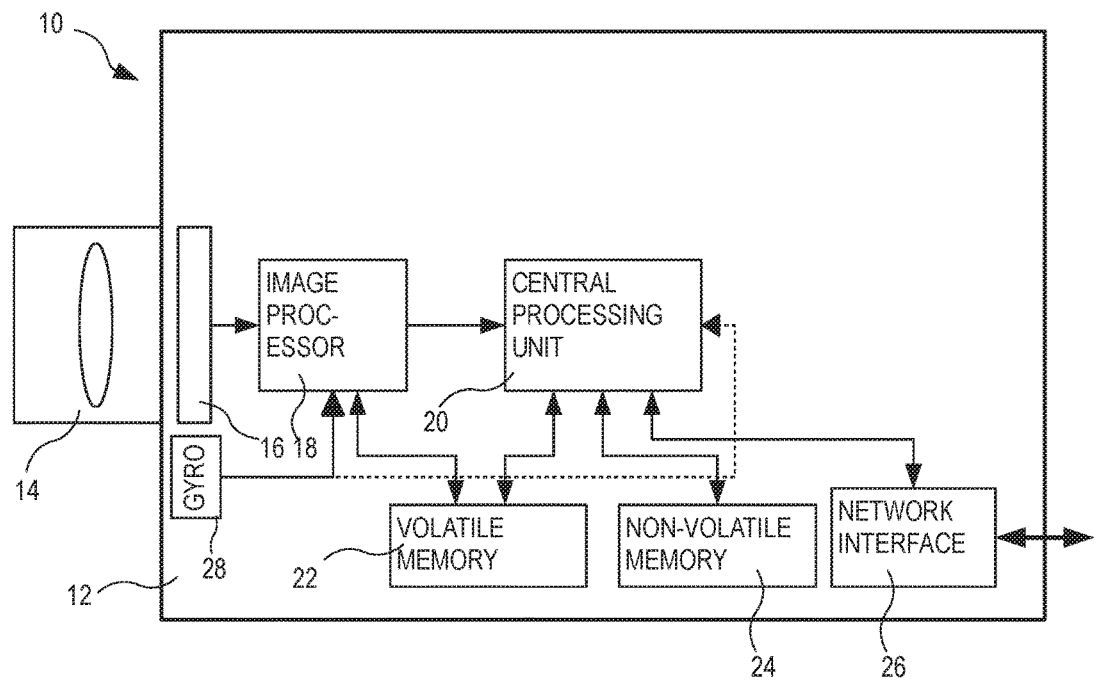
FIG. 1 is a schematic block diagram of a camera head according to one embodiment of the invention.

FIG. 1 is a block diagram of a camera head as used in a several embodiments of the present invention. The camera 10 has a lens 14 (a set of lenses, an objective, etc.) projecting light from the area to be imaged onto an image sensor 16. The information from the image sensor 16 is processed in an image processor 18 which may or may not form a part of central processing unit 20. The image processor 18 may in one or more embodiments be connected to and arranged to communicate with a volatile memory 22, which may be in connected to and arranged to communicate with the central processing unit 20. A non-volatile memory 24 may be arranged to communicate with the CPU 20 in a normal fashion. The video camera may also comprise a network interface 26 for communication within a network.

Adding to these features a hardware detector 28 is arranged to track a motion of the video camera. In the present embodiment the hardware detector 28 is a gyroscopic device or a set of gyroscopic devices monitoring inclination of the video camera in relation to a pan direction and/or a tilt direction. The output from the hardware detector 28 may be sent to the image processor 18 and/or to the CPU 20, performing a number of automatic and user-defined operations on the image, one of them being an (affine) transformation where pixels of the raw image are moved to the correct location e.g. based on input from sensors. The transformation may also include rearranging pixels in a distortion correction, accounting for optical distortions such as barrel distortion. The hardware detector 28 generally is a gyroscopic device or a device from which the corresponding parameters may be deduced, since the rotation or inclination is an important parameter to consider.

The effect of a vibration leading to a pan/tilt shift may be a significant displacement in the image, while a translational shift vertically or laterally merely results in a minor displacement. To give an example of the latter, 10 cm translation may result in 10 cm shift of the field of view in the object plane (i.e. resulting in a ignorable displacement in the image sensor), while 1 degree inclination may result in a significant shift in field of view in the object plane and an unacceptable displacement in the plane of the image sensor. Other hardware detectors 28 able to produce an output of similar properties may obviously be used instead or in a combination, such as tilt sensor or inclinometers of other types. Still, it may be mentioned that a translational shift is not excluded as such from a context in which the present invention may be utilized.

Figure 2:
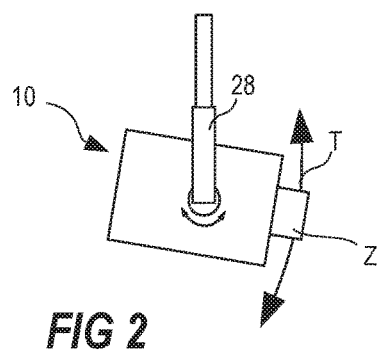
FIG. 2 is a schematic side view of a situation where an embodiment of the invention may be applied.
Figure 3:
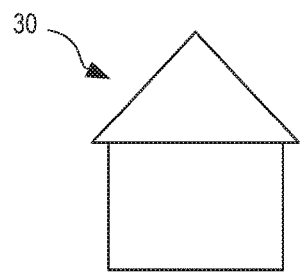
FIG. 3 is a plan view of the situation of FIG. 2.
Figure 3:
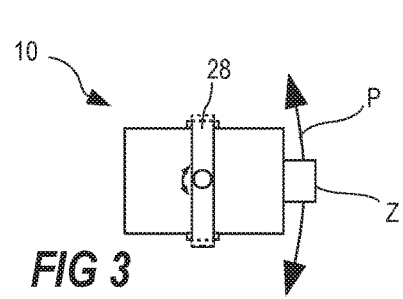

FIGS. 2, 3, 4a and 4b illustrate a situation where a method and a system according to one or more embodiments of the present invention could be benefitted from. FIG. 2 is schematic side view of a camera 10 set to monitor a building 30 and its immediate surroundings. The camera 10 is suspended in a camera holder 28, which is only schematically drawn. The camera 10 may tilt T in a vertical direction, and a zoom lens Z enables for a suitable focal length, and thereby field of view to be set in a straightforward fashion. FIG. 3 illustrates the same scene as in FIG. 2 from above, mainly illustrating the pan feature, P, which enables for a desirable view of the scene imaged by the camera 10 to be set in a straightforward fashion. In this context it may be pointed out that though there are video cameras that may affect pan, tilt, and zoom remotely controlled by an operator, the video camera does not have to be of this type for the present disclosure to be relevant. The camera holder 28 used for the camera 10 may be any type of suspension that allows for some degree of vibration or shake that may deteriorate the acquired video stream during certain conditions.

Figure 4A:
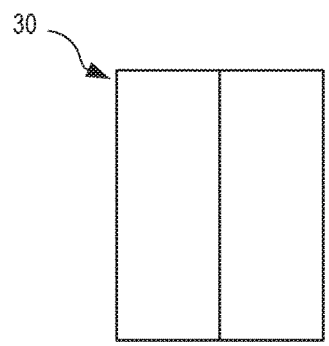
FIG. 4a is a first image frame acquired from a scene according to FIGS. 2 and 3.
Figure 4A:
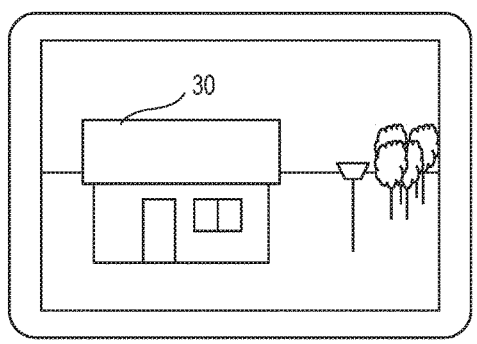
Figure 4B:
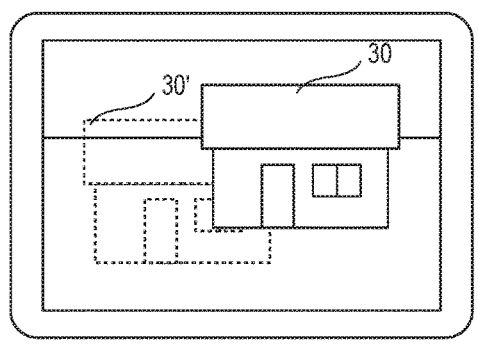
FIG. 4b is a second image frame, consecutive to the image frame of FIG. 4b.

The depictions of FIGS. 4a and 4b may be said to illustrate two consecutive frames of a video stream, symbolically provided with a frame. The first view of 4a illustrates the building 30 and a portion of the surroundings, including a lamp post and some trees. In the second frame, FIG. 4b, the view shows displacement as a result of vibration or shake. The original position of the building 30 is shown in dashed lines 30' and the position of the building 30 in the actual second frame is shown in full lines.

The shift in the field of view may be a result of an angular shift Δang of the camera in the pan and/or tilt direction and the problem arises as the shift in the field of view results in a displacement of position of the image on the image sensor Δis. The actual displacement of the image on the sensor would be directly derivable from the angular shift if the zoom settings were known, or more specifically, the present focal length of the lens system used for imaging, in combination with a value of the angular shift. This is since Δis may be expressed as a function of the focal length and the angular shift.

A straightforward way to understand this may be to introduce the field of view. The field of view may be defined as an angular sector extending from the imaging lens showing how much of the scene in front of the camera that will be imaged. The field of view may be defined by the focal length of the imaging lens, or focal length setting when a zoom lens is used and the size of the imaging sensor. In this way a known angular shift of the camera may be transformed to shift in pixel position on the imaging sensor.

Having a straightforward relation between the above parameters enables fast and simple compensation for vibrations, which may be performed live without introducing any significant lag of the video stream. No actual image analysis would need to be performed for the purpose of image stabilization, which may speed up the process even further.

In the present embodiment the focal length is not known, yet the angular shift is known from the hardware detector. The purpose is to minimize the effect of shake or vibration, and therefore another input will be a value for a threshold of what is to be considered as acceptable for the displacement on the image sensor. The value of what is to be considered as acceptable may be preset, yet it may also be decided by an operator, e.g. an operator studying the corrected video may shift the threshold up or down. In later embodiments it will be obvious that what is to be considered as "acceptable" may include some qualitative considerations.

Figure 5:
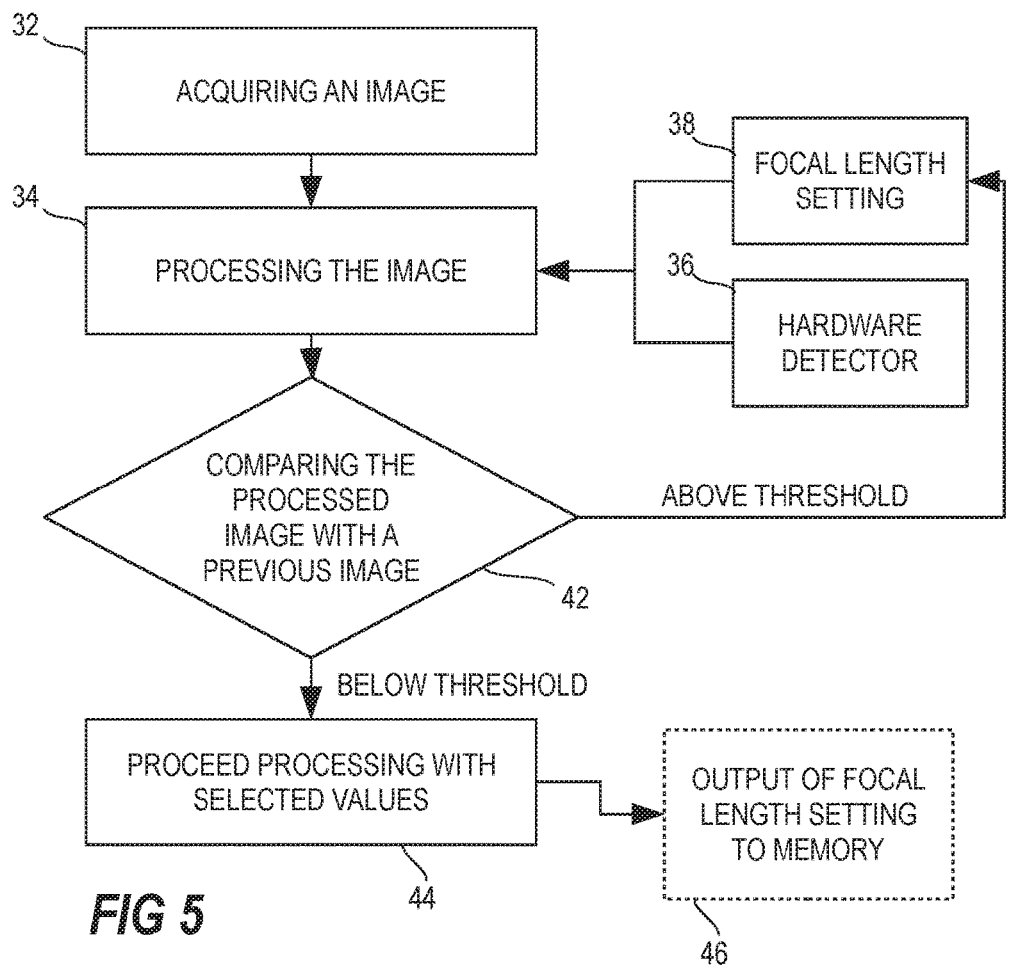
FIG. 5 is a flowchart showing a process according to a first embodiment of the present invention.

Referring now to FIG. 5, in the first embodiment, therefore, a process will include acquiring an image in a first step 32, and processing 34 that image in a displacement-correction algorithm using the input from the hardware detector (Δang) 36. The processing is also based on a value of the focal length setting 38. At this point the actual focal length is considered to be unknown and the first setting may be based on a user input 40 or any other value. A starting point may be the latest evaluated value for the focal-length setting. If such a value is not available, or if there is no desire in using such a value, the possible settings for the focal length may still be limited to a particular range as defined by the possible focal-length settings for the particular lens used in the camera, and it is to be understood that the input value may be chosen within that range, for convenience.

In a subsequent step 42 the acquired and processed image is compared to a previous image, and it is determined if the remaining displacement after displacement correction is within a range considered as acceptable. Again, what is to be considered as acceptable may be based on comparison with a threshold value, which in turn may be preset or decided by an operator in a step 48. If the remaining displacement is outside of the acceptable range it may be deduced that the algorithm undershot the correction or if it overshot the correction. In the step 42 of comparing the images any existing method may be used, and a possible output from such method may be an averaged value for a motion vector describing how a finite number of distinguishable shapes have been displaced.

In regard of the averaged motion vector standard image analysis includes an evaluation of motion vectors over the image as a whole, or of selected areas. The selected areas may e.g. comprise a stationary background, which by definition should not display any motion. What is to be defined as background in a particular view may be identified by well-known standard image processing or image analysis, and the techniques used will not be disclosed in detail herein. Objects identified as background may be houses, roads, pavements, lampposts, etc., i.e. objects that are not expected to display movement between consecutive frames in a video stream. The mentioned objects, i.e. manmade stationary objects, are often characterized in having distinct edges, just to mention one characteristic that may be used in image analysis.

If the displacement correction results in an acceptable discrepancy the process is finalized, and the process may enter a steady-state feed 44 where the focal length value may be stored 46 for use in subsequent shift correction too, and it may be made visible to an operator monitoring the output from the video camera. It should be understood that even if the word "focal length" throughout the present description, the value actually inserted and used in the process may be another measure, from which the focal length may be readily deduced.

If the displacement correction is inadequate the above steps may be iterated as long as necessary, wherein the input value for the focal-length setting is altered. The evaluation of the shift correction 42 may determine the direction in which the focal-length setting should be altered. The processor may use a hill climbing algorithm to arrive at an optimal value for the focal length, yet there are numerous other algorithms that may be used to find the optimal value for the focal length.

The process may perform the iterations on the same set of images until an acceptable result is achieved. In other embodiments the process may acquire a new image each time so as not to introduce any lag in a video stream or merely to increase the statistics, by introducing an averaging effect by increasing the data set, varying the range over which Δang is selected. Still, the process may be made without any input from the operator. Irrespective of the option selected an output from the process may still be a value quantifying the focal length. In the first embodiment where a set of images are reused the method may run in the background while the feed of a video stream continues with the current values of the focal-length setting. When the process has reached a result the current value is replaced by the updated value.

The shift correction algorithm may be time resolved in the sense that it accounts for that different parts of the image sensor have been exposed at different times. This may be affected by allowing for the continuous output from the hardware detector (the gyroscopic device) to be coupled to different positions of the image sensor. Such a feature may be particularly relevant when using a rolling shutter mechanism, where e.g. different rows have experienced different shifts.

Figure 6:
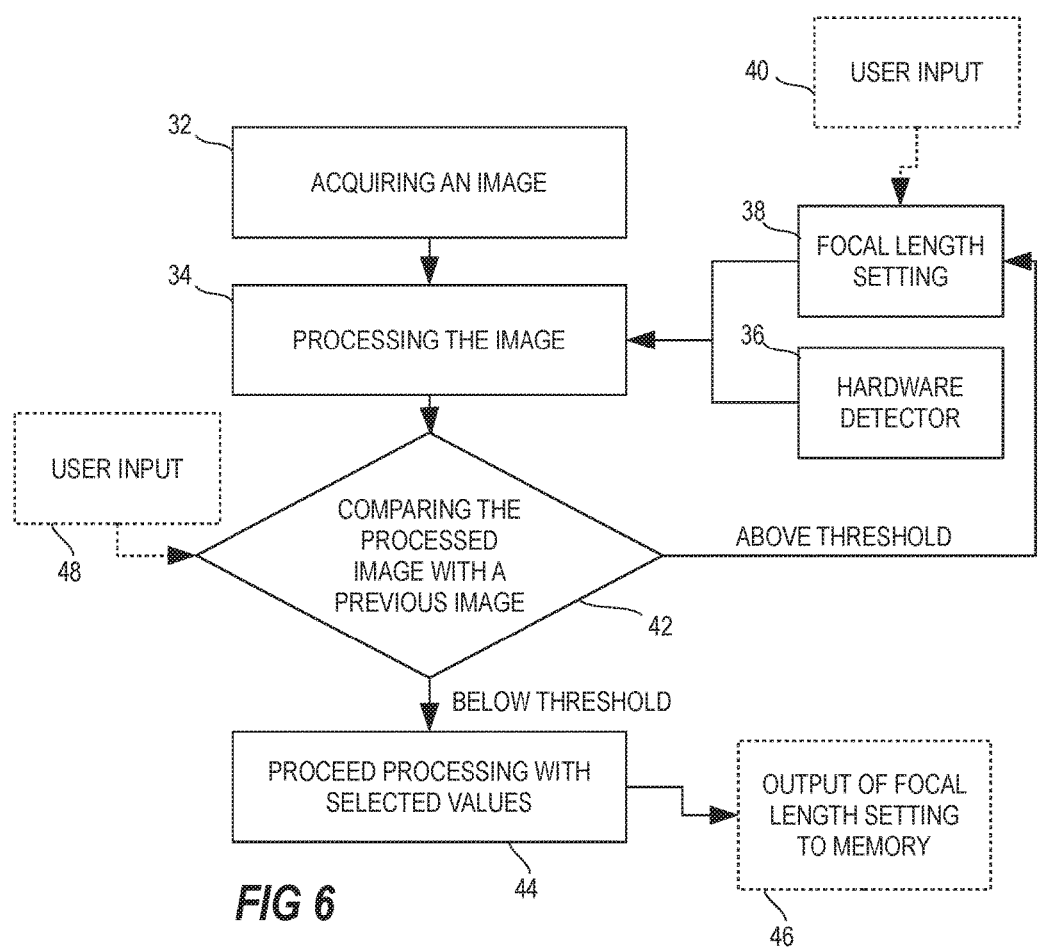
FIG. 6 is a flowchart similar to FIG. 5 showing a process according to a second embodiment of the present invention.

Furthermore, as have been mentioned before the operator may obviously decide what is to be considered as "acceptable" in terms of a residual shift in the video stream, by entering a threshold value or tuning in another way. This is illustrated in FIG. 6, where the user may provide input values in regard of the focal length setting (step 40) and/or in regard of a threshold (step 48). If the operator does not decide, a preset value for the threshold may be provided and used. Steps of FIG. 6 that are similar or identical to steps of FIG. 5 will not be explained further.

Figure 7:
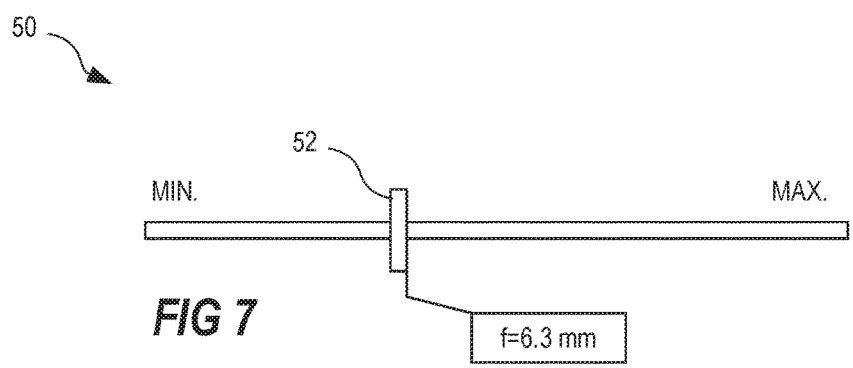
FIG. 7 is a schematic view of a slider used in a third embodiment of the present invention.

In a third embodiment the operator input is increased further. This is crudely illustrated in FIG. 7, basically showing a slider 50 of an HMI visible for the operator. The slider-view may visualize the full range of possible focal lengths for the video camera in question, and the indicator 52 may illustrate the current settings for the focal length. In a situation where the operator observes a vibrational displacement in the image it will be possible for the operator to slide the indicator, resulting in an amended value for the focal length to be used by the process (entered in step 40 of the flow chart of FIG. 6). This may be performed until the vibrational displacement is on an acceptable level, as determined by the operator and in this embodiment the "acceptable level" is qualitative when compared to the embodiments where a preset threshold is used. The operator may verify that the displacement is acceptable in step 48 of FIG. 6, yet a silent accept may also be that the slider is no longer adjusted. A silent accept is meant to correspond to that a presently set value for the focal length setting is used until the slider is adjusted further. This embodiment basically corresponds to the second embodiment but for the absence of the automated step of comparing. The use of a slider is obviously one example of many for an operator to provide input.

Once the operator is satisfied with the displacement compensation the process carries on with the now set value quantifying the focal length, and it will in any case proceed with the current values, optimal or not. The focal length value may in this embodiment as well as in any of the other embodiments, apart from being stored, be forwarded or utilized by other processes.

In any of the embodiments the process may be set to proceed with a current value for the settings, e.g. for the focal length, when no other input is provided. For the operator-assisted optimization it is readily realized that the operator may not be able to adjust the focal length settings at a rate comparable to the read-out rate from the image sensor, and in the absence of input the process will proceed with the present values.

The process may also be used in a sequence of calibrating a video camera, simply by forcing the camera to shake or vibrate. Such a calibration may be conducted by simply applying an impact to the structure onto which the video camera is mounted, e.g. a post, a mounting etc. where after the calibration of the focal length, namely the process for the vibration compensation or image stabilization may be initiated by the hardware detector detecting a motion, or by any other suitable means.

Cameras having a pan and/or tilt function, that is cameras which may be remotely controlled to perform a pan motion or a tilt motion, may require more complex control algorithms. A straight-forward approach is to inhibit operation of the image stabilization during pan and/or tilt. This crude approach may be replaced with more refined approaches where the intentional shift (due to the expected pan and/or tilt motion) in pan and tilt is cancelled out from the image stabilization, while the motion caused by shake or vibration is accounted for.

The method may also be used to optimize any system for vibration compensation.

According to the present disclosure there is a correction of the image as a result of vibration using a preset value of the focal length. A set of images is then evaluated in regard of shift effects. If the shift is not adequately handled the value for the focal length is changed in the appropriate direction until the shift is below an acceptable threshold. In this way the effect of rotation is cancelled AND a value of the focal length is deduced. The value for the focal length may be important input in other processes. Some examples of when the focal-length settings may be used include optimization of exposure settings, performing distortion correction, image stabilization (minimization of the effect of vibration and shake), and the mere ability to present the focal-length setting to a user for the user to utilize in any other way, to mention a few.

What is claimed is:

1. A method for image stabilization, the method comprising:
    capturing a first image of video and a previous image of the video by means of a video camera having a lens with an unknown focal-length setting and running an image stabilization process, wherein the image stabilization process operates on an input value from a hardware detector that detects displacement of the camera, and on a current focal length value of an adjustable focal length value,
    correcting positional image displacement within the first image based on the input value from the hardware detector and the adjustable focal length value to form an image-stabilized image,
    evaluating positional image displacement of the image-stabilized image as compared with the previous image of the video at the current focal length value, and
    adjusting the current focal length value until the evaluated positional image displacement is below a threshold value or at a minimum.

2. The method of claim 1, wherein the adjustable focal length value is adjusted based on a user input.

3. The method of claim 1, wherein the threshold value is pre-set.

4. The method of claim 1, wherein the threshold value is set by an operator.

5. The method of claim 1, wherein the adjustable focal length value is adjusted according to an iterative optimization process until the displacement is below the predetermined threshold value.

6. The method of claim 1, further comprising outputting a quantification of the adjustable focal-length value.

7. The method of claim 1, wherein evaluation is performed on consecutive images in an image stream until the evaluated displacement is below the threshold value.

8. The method of claim 1, wherein the hardware detector detects an angular shift.

9. The method of claim 1, wherein the hardware detector is an inclinometer, such as a gyroscopic device or a tiltmeter/tiltsensor or an accelerometer.

10. The method of claim 1, wherein the hardware detector detects a displacement of the video camera continuously, and wherein a time stamp of the displacement may be correlated with data of an individual frame.

11. Use of the method according to claim 1 in a process of quantifying the focal length for a video camera system, the process comprising directly or indirectly inducing a shake or vibration to the video camera prior to or during applying the method.

12. A system for image stabilization of output images from a video camera using as input:
    an output value of a hardware detector detecting a displacement of the video camera, and
    a current focal length value of an adjustable focal length value
    wherein the system comprises a processing unit configured to:
    obtain a first image of a video and a previous image of the video from the video camera, the video camera having a lens with an unknown focal-length setting and running an image stabilization process,
    correct positional image displacement within the first image based on the input value from the hardware detector and the adjustable focal length value to form an image-stabilized image,
    evaluating positional image displacement of the image-stabilized image as compared with the previous image of the video at the current focal length value, and
    adjusting the current focal length value until the evaluated positional image displacement is below a threshold value or at a minimum.

* * * * *